United States Patent Office 2,846,036
Patented Aug. 5, 1958

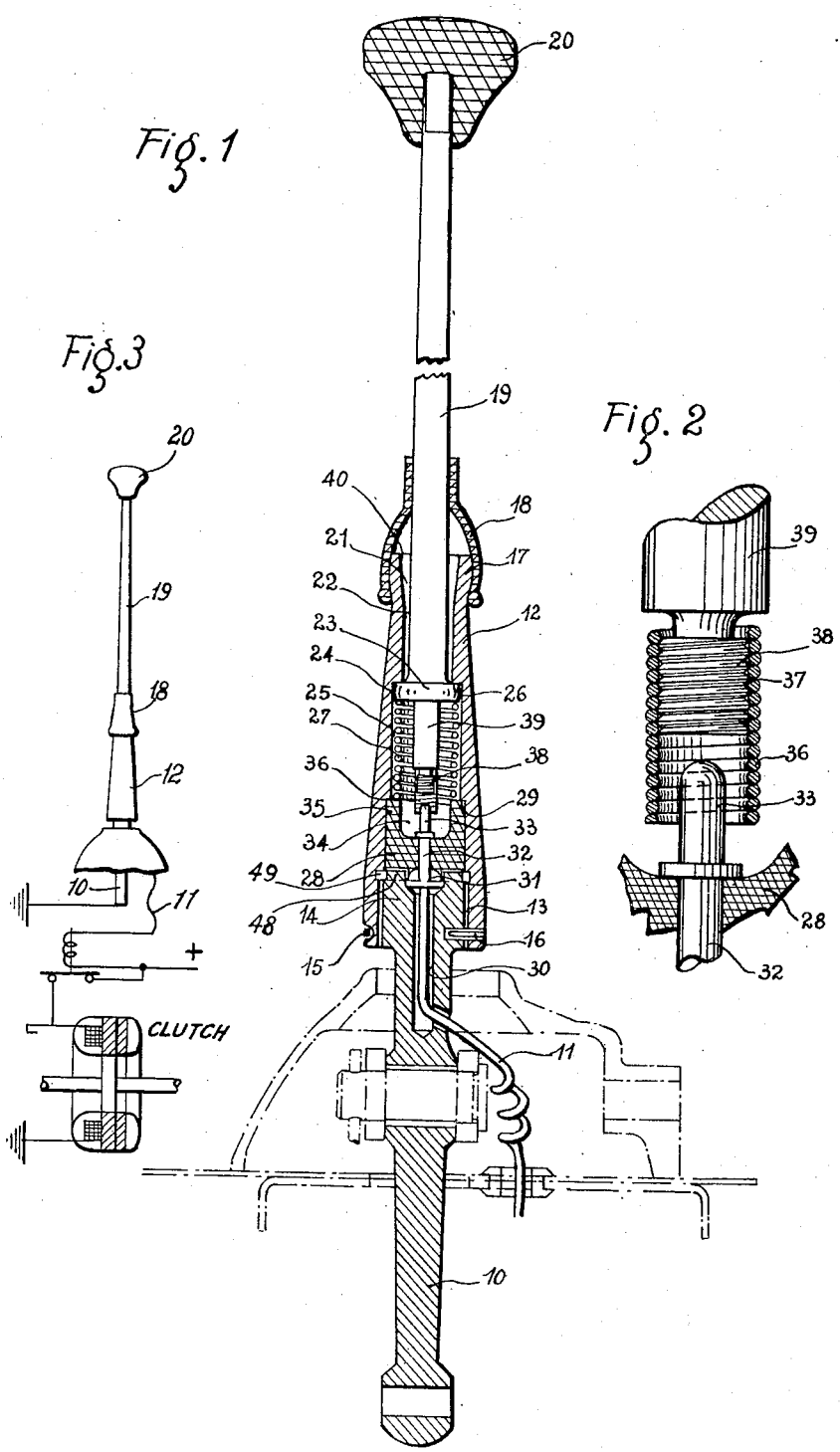

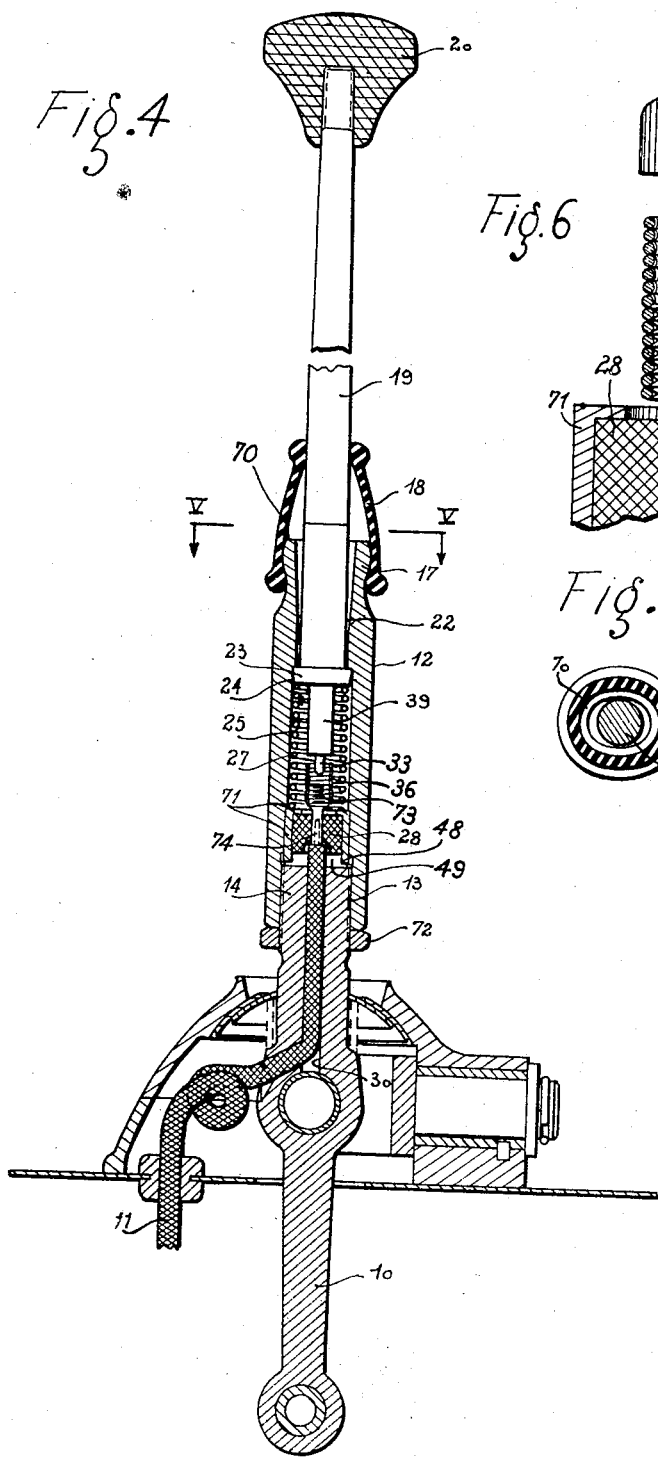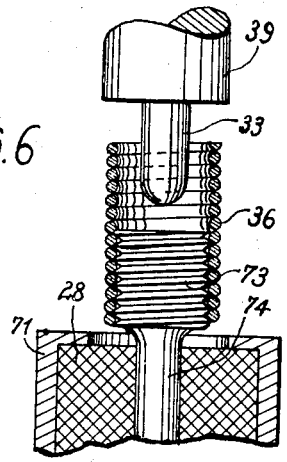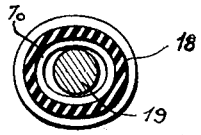

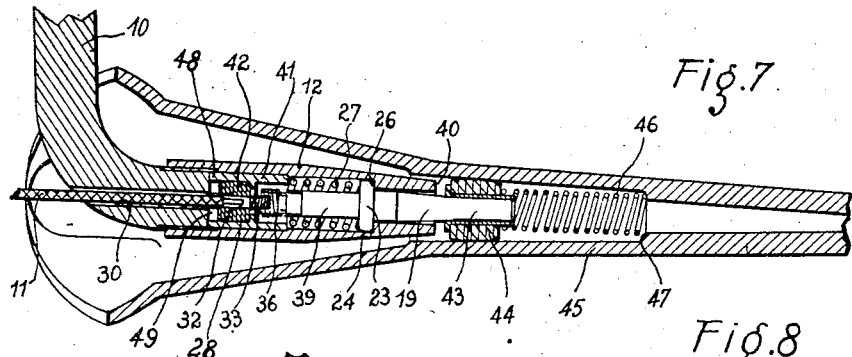
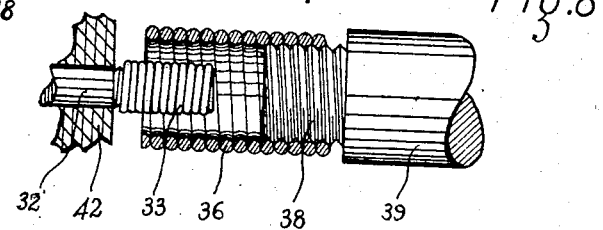
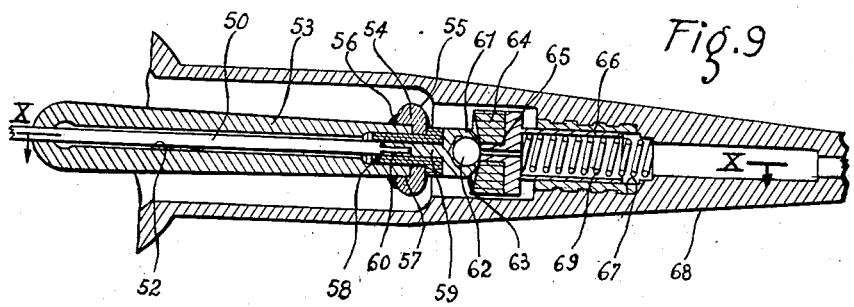
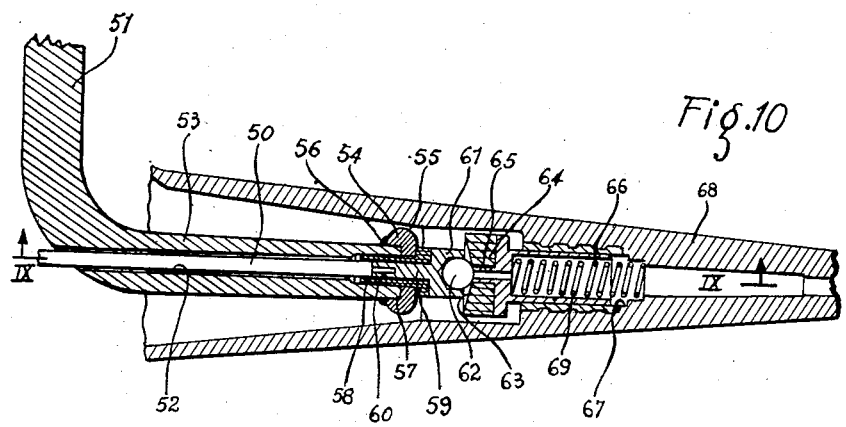

2,846,036

GEAR-CHANGING LEVERS

Jean Maurice, Ablon, and Michel Rist, Paris, France, assignors to Societe Anonyme Francaise du Ferodo, Paris, France, a French corporation Application February 18, 1954, Serial No. 411,229

Claims priority, application France February 23, 1953

24 Claims. (Cl. 192—3.5)

The present invention relates to a gear-changing lever, especially adapted for automobile vehicles, of the kind known as a "broken" or two-part lever, comprising an actuating member intended to be operated by the user and a control member connected to the gear-box, the actuating member being mounted so as to be movable in every direction on the control member, following a pre-determined travel starting from a central position of rest, and tending to be brought back into the said position of rest by means of a spring device, the said members becoming rigidly coupled by abutment beyond the said travel, whilst an electric switch, which controls either directly or indirectly through a relay a clutch co-operating with the said gear-box, is associated with the said members in order to control the engagement or disengagement of the clutch, depending on whether the actuating member is located in the said central position of rest or is displaced from that position.

Two-part or divided levers of this kind, associated with an electrically-operated clutch, make for easy driving of the vehicle, since the driver is not troubled with questions of engagement or disengagement of the clutch. However, the known forms of construction of two-part levers with an actuating member movable in any direction on the control member, have serious drawbacks.

In particular, in the known types of lever, it is the electric switch itself which transmits the effort required to actuate the gear-box and this switch rapidly becomes defective. In addition, various defects have been experienced in known levers after a short time of use, particularly a tendency of the members to become out of centre and to buckle, a rapid deterioration and unreliable operation of the device for restoring the lever to the position of rest, the latter consisting most frequently of rubber, and a very rapid wear of the electric wires and connections.

In addition, the driver must operate the known types of lever with certain precautions in order to obtain correct operation. In particular, the driver is obliged to grip the lever by its extremity or in the immediate vicinity of the extremity, and this constitutes an annoying inconvenience.

The present invention has for its object a lever of the kind referred to, having an actuating member movable in every direction upon the control member, which is free from these drawbacks and which is of simple and robust construction, having also great ease of operation free from all risks.

In accordance with the invention, a gear-changing lever of the two-part type referred to, with an actuating member movable in every direction upon the control member, is characterised in that the portions of the said members which abut against each other in order to make these members mechanically rigid with respect to each other, are separate from the contacts of the electric switch, and also in that a relative latitude of movement in all directions of the two contact-carrying elements of the said switch is chosen so as to be greater than the relative latitude of movement of the actuating member and the control member and is thus only limited by the mechanical abutment of the said portions. By virtue of this arrangement, the contacts of the electric switch have no part in the control of the gear-box and have an almost unlimited life, whilst the possibility of movement of the members and the contacts of the switch in all directions enables the lever to be applied to any kind of gear-box gate whatever, with a sure operation of the clutch, independently of the manner in which the driver seizes or releases the actuating member and at any part whatever of this latter.

In accordance with a further feature, the contacts of the switch are arranged in such a manner that the switch is brought into action by a relative movement of the contacts which is less than the maximum travel permitted by the separate mechanical abutment. With this arrangement, the disengagement of the clutch is effected under sure and favourable conditions before the change of gears is actually initiated.

In accordance with a further feature, the contacts of the switch are arranged in such a way that the switch comes into action when the relative movement of the actuating member and the control member has reached a value between 20% and 80% and preferably between 40% and 60% of the maximum travel permitted by the mechanical abutment. In this way it is ensured that the simple fact of accidentally touching the lever does not cause disengagement of the clutch, whilst at the same time providing great safety of operation when the movement of the lever is intentional.

In accordance with a further feature, the mechanical abutment projections and the separate electric switch are respectively spaced apart in the sense of the length of the lever and are housed within the interior of the latter.

In accordance with yet another feature, the elastic means for restoring the actuating member to its central position of rest consist of a calibrated tensioned helicoidal spring extending into the interior of one of the elements in the direction of the length of the lever, the calibrating pre-stress of the said spring being chosen at a value greater than that which corresponds to the force necessary to prevent vibrations of the said actuating member and to resist non-intentional external actions affecting the latter, but being chosen to be less than the value which corresponds to the force necessary to operate the gear-box. In this way, an operation without risk is obtained over an almost unlimited period, the spring remaining true and not being liable to aging. In addition, the calibration of the spring can be easily regulated with great precision by virtue of the fact that the controlled longitudinal force of the spring corresponds to a very much smaller useful transverse force.

In accordance with a further feature, one of the switch contacts is mechanically coupled to the actuating member and is constantly connected to ground whatever may be the relative position of the actuating member and the control member.

Other objects, features and advantages of the invention will become further apparent from the description which follows below with reference to forms of construction chosen by way of example with reference to the attached drawings, in which:

Fig. 1 is a view in longitudinal cross-section of a gear-lever in accordance with the invention;

Fig. 2 is a detailed view on a larger scale of a part of Fig. 1;

Fig. 3 is a general view in elevation of the lever shown on a small scale;

Fig. 4 is a view in longitudinal cross-section of an alternative form of lever;

Fig. 5 is a view in cross-section of this modified form following the line V—V of Fig. 4;

Fig. 6 is a detailed view to a larger scale of a part of Fig. 4;

Fig. 7 is a view in longitudinal cross-section of a further alternative form of lever;

Fig. 8 is a detailed view to a larger scale of a part of Fig. 7;

Fig. 9 is a view of a still further modification, shown in cross-section following the line IX—IX of Fig. 10;

Fig. 10 is a view of this latter embodiment in cross-section following the line X—X of Fig. 9.

The form of embodiment shown in Figs. 1 to 3 is concerned, by way of example, with an application of the invention to an automobile vehicle comprising a gear-box and a clutch, an electric circuit being associated with the clutch in such manner as to cause the disengagement of the clutch when it is closed and the engagement of the clutch when it is opened. There will be seen at 10 of Fig. 1 the control member of the gear-lever which operates the control mechanism (not shown) of the gear-box. The member 10 is of conducting material and is connected to ground. An electric conductor 11 forms part of the electric circuit associated with the clutch, this circuit being closed or open, depending on whether the conductor 11 is connected to ground or is insulated from ground. The lever of Figs. 1 to 3 has been illustrated as a floor-type lever but it may be adapted for mounting on a steering column without appreciable modification.

A hollow tubular sleeve 12 is screwed at 13 to the upper extremity 14 of the operating member 10 of the lever and is locked in position on this extremity 14 by a thin rod 15 tailed in around the sleeve and readily engaged at 16 in the extremity 14. The sleeve member 12 which is mounted along the line of extension of the member 10 is provided with an external upper enlarged portion 17 around which is fixed an elastic hood 18 for protection against dust. The hood 18 fits tightly round an extended conducting rod 19 which forms the actuating member of the lever. It will be appreciated that the actuating rod 19 extends as far as the whole area readily accessible to the user. The user may thus actuate the rod 19 at any part whatever along its length without taking any special precautions. The rod 19 may carry at its upper extremity an operating ball 20 and extends approximately in the line of prolongation of the sleeve 12. The rod 19 also passes into the interior of the sleeve and is normally spaced from the upper orifice 21 of the sleeve by an annular clearance 22. Approximately at the mid-height of the sleeve, the rod 19 comprises a small annular enlarged collar 23, the external lateral face 24 of which forms part of a sphere. The spherical face 24 is housed in an enlarged central hole 25 of the sleeve and is applied in contact with this enlarged portion, so that the actuating rod 19 is mounted movably in all directions upon the member 12, 10 and is constantly in electrical contact with the control member 12, 10, the latter being connected to ground no matter what the position of the rod 19 may be. It will thus be noted that the small collar 23 forms at the same time a universal coupling between the actuating member and the control member and a permanent means of connecting the actuating member to ground.

The small collar 23 abuts against the shouldered portion 26 formed between the internally drilled portions 25 and 21 under the action of a spiral spring 27 of appreciable length. The latter extends into the interior of the drilled portion 25 and is applied at its other extremity against an insulating ring 28. The ring 28 is locked in position by the threaded portion 13 between the part 14 of the control member 10 of the lever and a shouldered portion 29 formed at the end of the drilled portion 25. The calibrating pre-stress of the spring 27 is fixed at a value higher than that which corresponds to the force required to prevent vibration of the rod 19, taking account of the position of the centre of gravity of this latter with respect to the small collar 23, but is chosen to be less than the value which corresponds to the effort necessary to actuate the gear-box. The position of the centre of gravity of the rod 19 may furthermore be chosen or regulated in accordance with the invention, so that the risk of vibration of the rod is reduced to a minimum.

The conductor 11 which passes through a passage 30 inside the member 10 up to the extremity 14 is soldered or inset at 31 to a silver finger 32 which passes through the ring 28 and is retained on the other side of this ring by a projecting nipple 33 having a rounded end. As can be seen, the ring is hollowed out in cross-section at 34 at its upper portion and it is inside this cup-shaped hollow that the nipple 33 extends, whilst the spring 27 is supported on the upper peripheral edge 35 of this cup.

The insulating ring 28 is rigidly coupled for rotation with the extremity 14 of the member 10 by means of tenons 48 formed on the extremity 14 and engaging with slots 48 on the ring 28. By virtue of this arrangement, when the sleeve 12 is screwed on to the member 10 during the assembly of the lever, the ring 28 is prevented from rotating and there is thus no risk of its twisting or tearing off the wire 11.

A conducting spiral spring member 36 of tubular shape and constituted by a length of silvered piano wire or by silvered bronze wire has its turns very closely wound but not touching. This spring sleeve 36 which forms one of the contacts of an electric switch, surrounds the nipple 33 forming the other contact with a suitable spacing, and is retained by screwing at 37 on the threaded end 38 of an extension 39 of the rod 19, this extension being of smaller diameter. The extension 39 and the spring sleeve 36 are widely spaced from the walls of the cavity formed by the spring 27 and by the cup member 34.

In order to obtain perfect centering of the spring sleeve 36 with respect to the extension 39 and ultimately in the position of rest, with respect to the contact 33, the sleeve 36 is not fully screwed home on the threaded end 38. The latitude of movement of the moving contact 36 with reference to the fixed contact 33 is greater than that which results from the mechanical abutment at 40 of the actuating member 19 against the control member 12, 10. According to the invention, there is provided between the last screwed turn of the contact 36 and the turn which is contacted by the rounded portion of the contact 33 at least two free turns and preferably more.

In normal operation, the rod 19 is not touched. The spring 27 maintains the small collar 23 uniformly forced against the shouldered portion 26, so that the rod 19 is accurately centered inside the drilled portion 21, the annular clearance 22 being constant, whilst the spring sleeve 36 is spaced around the nipple 33. The conductor 11 is insulated from ground and the electric circuit is open. The clutch is in the engaged position.

It will be appreciated that the spring 27 deadens almost all the vibration liable to be transmitted to the rod 19 and has a constant behaviour by virtue of its considerable length whilst its working life is almost unlimited.

To change speeds, a force is applied in any suitable or convenient direction to the ball 20 or as desired to any other accessible part of the rod 19. The latter moves first of all with respect to the sleeve 12 by the rolling and sliding action of the spherical face 24 against the drilled portion 25, a portion of the upper face of the small collar 23 being supported against the shouldered portion 26, whilst the diametrically-opposite portion is separated from this shouldered portion against the action of the spring 27. This spring is too weak to overcome the resistance offered by the operating mechanism of the gear-box, and the sleeve 12, together with the lever 10, remain in the same position. The rod 19 which thus pivots through the small collar 23, has a limited travel and at the end of its travel, it abuts against the upper opening 40 of the sleeve 12. It will be noted that this upper opening is axially spaced by a substantial amount from the electric switch 36, 33, and is bell-mouthed in order to improve its mechanical contact with the rod 19.

During this period, the spring contact 36 has been applied effectively in contact against the contact 33, that is to say before the rod 19 abuts at 40 against the member 12, 10. The contacts 36 and 33 are arranged, in accordance with the invention, in such a way as to make contact when the relative movement of the rod 19 and the member 12, 10, reaches a value comprised between 20% and 80%, and preferably between 40% and 60%, of the travel permitted by the mechanical abutment at 40. By virtue of this arrangement, it is ensured that the simple fact of accidentally touching the lever does not cause disengagement of the clutch, whilst this disengagement is effected in a positive and sure manner before any change of gears which is carried out deliberately.

During that phase of the movement in which the contacts 36 and 33 have come into contact and in which the rod 19 moves up to the abutment at 40, the contact 36 is deformed elastically. In accordance with the invention, the latitude of deformation of the spring contact 36 with respect to the contact 33 is chosen so as to be greater than the relative travel of the members 10 and 19 and is limited only by the mechanical abutment at 40 of the rod 19, so that the switch 33, 36, does not transmit any mechanical force.

When the contact is made at 36, 33, the conductor 11 is connected to ground through the medium of the small collar 23 and the sleeve 12. The clutch is then disengaged.

The movement of the rod 19 which continues, brings the rod against the abutment 40 provided on the control member 12, 10, and then carries this member along with it in a rigidly-coupled manner, until the new speed has been engaged. When the rod 19 is released, it is returned to an exactly central position by the action of the spring 27. The switch 33, 36, opens and the electric control circuit of the clutch is such that the latter becomes engaged.

It should be borne in mind that the whole of this operation is carried out very rapidly and almost without any appreciable transition as far as the user is concerned, between the floating and blocked positions or vice-versa, of the rod 19 in the sleeve 12.

It will be especially noted that there are no external wires, and therefore none are visible, in the assembly rod 19-sleeve 12, and that the electric switch 36, 33, does not transmit any force between the actuating member 19 and the operating mechanism of the gear-box. A switch of this kind thus lasts almost indefinitely, particularly as its contact members 36 and 33 are silvered. In addition, correct operation is ensured irrespective of the manner in which the driver actuates the lever 19.

In the fairly rare cases in which wear or a fault arising in the member of the gear-box require the user to keep his hand on the lever, an operation of this kind can be effective. To this end, the user has merely to seize the sleeve 12 after having operated the rod 19.

In an alternative form of embodiment (Figs. 4 to 6), the arrangement is identical with that which has been described above with reference to Figs. 1 to 3, except that a few details of construction have been modified. The same reference numbers have been adopted in Figs. 4, 5, 6 and in Figs. 1, 2, 3, to refer to similar members.

As in the previous case, the rod 19 is separated from the hollow sleeve 12 by a clearance space 22. The upper opening 70 of the sleeve 12 has in this case however, an oval cross-section so that the travel of the rod 19 up to the abutment at 70 varies according to the direction in which the rod 19 is actuated. This arrangement enables an accidental operation of the switch 33, 36 to be avoided when, in the case of a floor-mounted lever, the clothing of the user rubs against the rod 19. The advantage of a hard and convenient operation is preserved since the rod is always universally mounted at 23 on the control member 10 and also since the user does not have to study the manner in which he grips the road 19 in order to disengage the clutch when changing gears.

The insulating ring 28 is enclosed in a metallic sheath 71 intended to act as a support for the spring 27 and thereby to avoid the flattening effect of the spring on soft insulating material. The thin rod 15 is, on the other hand, replaced by a lock-nut 72. The latter ensures that the sleeve 12 is locked in position on the member 10 and enables, in addition, the orientation of the major axis of the oval opening 70 to be easily varied in accordance with requirements for correct operation.

In addition, the switch 33, 36, is modified, the rigid contact 33 being fixed on the extension 39 of the rod 19, whilst the elastic sleeve 36 is screwed on the threaded end portion 73 of a finger 74 mounted inside the ring 28 and connected to the conductor 11.

In an alternative construction (Figs. 7 and 8) the arrangement is still similar to that described with reference to Figs. 1 to 3, with the exception that the operating ball is mounted on a cap instead of being mounted on a rod. The same reference numbers have been used for Figs. 1 to 3 and for Figs. 7 and 8.

There will be recognised at 10 in Fig. 7 the control member of the gear-box, but in this case, the lever has the shape of a walking-stick handle so that it may be adapted to the steering column, in which case the sleeve 12 is approximately horizontal instead of being vertical.

It will be noted that the member 28, instead of being wholly of insulating material, comprises an external sleeve 41 on which the spiral tension spring 27 is supported, and an insulating central core 42, through which passes the finger 32.

The rod 19 comprises, on the remote side of the opening 40 in the sleeve 12, a short end-portion 43 which carries a flexible ring 44 on which is mounted the actuating cap 45, the ball arranged on the extremity of the cap not being shown. A spring 46 inserted between the ring 44 and the bottom 47 of the cap maintains the ring in the correct position.

The switch 33, 36, is exactly the same as that shown in Fig. 2, except that the contact 33 consists of a spiral spring sleeve with very closely-wound turns, but which do not touch each other, the two contacts 33 and 36 being thus both elastically mounted.

The operation of the arrangement shown in Figs. 7 and 8 is similar to that which has been described with reference to Figs. 1 to 3, with the exception that the rod 19 is replaced by the assembly: cap 45—spring 46—ring 44—end-member 43. It will be noted that the current is returned to ground through the shouldered portion 26, the sleeve 12, and the member 10, the actuating member 45 being itself connected to ground.

In a further alternative form of embodiment (Figs. 9 and 10), the arrangement is still the same as those which have been previously described. However, contrary to the previous arrangements, the electric circuit associated with the lever acts to disengage the clutch when it is opened and to engage the clutch when it is closed.

There will be seen at 50 in Figs. 9 and 10, an electric conductor of this circuit, the circuit being closed or open depending on whether the conductor 50 is connected to ground or not, and at 51 is shown the cranked control member for the operating mechanism of the gear-box, mounted on the steering column.

As in the previous cases, the conductor 50 passes through a passage 52 formed in the horizontal portion 53 of the control member 51.

A disc 54 having rounded edges 55 is fixed at 66, for example by welding, to the horizontal portion 53 of the control member whilst an insulating sleeve 58 is inserted in a wide drilled portion arranged in the extremity 57. A metal finger 59 extending into the sleeve 58 and connected at 60 to the conductor 50 has inset at 61 a ball 62 of silver or plated with silver and forming one contact of the electric switch. The ball 62 bears against a conical bowl 63, the peripheral part of which is constituted by an insulating ring 64 whilst the centre part consists of a metallic finger 65. This latter finger is of silver or is silver-plated and carries the ring 64. The finger 65 which forms the other contact of the switch is integral with a hollow metal piston 66 which is slidably mounted in a bore 67 arranged in the operating cap 68 which carries at its end a ball (not shown). A spring 69 extending into the interior of the piston 66 is applied between the piston and the cap so as to press the bowl 63 against the ball 62. The spring provides the ground connection for the finger 65 through the intermediary of the cap 68 which it itself connected to ground through its base. The cap 68 freely surrounds the finger 65 and is extended to be spaced in the usual manner around the disc 54.

In normal operation, the ball of the cap 68 is not touched. The spring 69 keeps the metal base 65 of the bowl 63 held against the ball 62 so that the cap 68 is accurately co-axial with the portion 53 of the control lever 51. The conductor 50 is connected to ground and the electric circuit is closed. The clutch is engaged.

It will be noted that the spring 69 damps out almost all the vibration liable to be transmitted to the cap 68, so that the latter is kept stationary with respect to the portion 53 of the control member 51.

In order to change gears, a pressure is applied in any appropriate or convenient direction to the cap 68. This cap moves in the first place by sliding of the piston 66 in the bore 67 against the action of the spring 69, and by rolling action of the ball 62 against the bowl 63. The spring 69 is too weak to overcome the resistance presented by the operating mechanism of the gear-box, and the control lever 51 remains stationary. Such a travel of the cap 68 is limited by the abutment of the disc 54, the rounded edge 55 of which comes up against the cap 68, the latitude of movement of the ball 62 along the bowl 63 being greater than the relative travel of the members 51 and 68 and is limited only by the mechanical abutment at 55. The metal finger 65 leaves the ball 62 before the abutment at 55 comes into play, and it is the insulating ring 64 which bears against this ball. The conductor 50 is thus insulated from ground and the clutch is disengaged.

Once the abutment at 55 becomes operative, the continuing movement of the cap 68 carries with it now in a rigid manner the control lever 51 until the new gear is engaged. When the cap 68 is released, the latter is restored to an exactly central position by the action of the spring 69. The electric circuit is then closed and the clutch is engaged.

As in the case of the arrangements previously described, there are no external wires in the assembly: cap 68—control member 51, and the electric switch 62, 65 does not transmit any effort between the cap 68 and the control member 51, since such an effort is wholly transmitted by the disc 54. It will be understood that in the case of the application of the lever to clutches in which the electric circuit serves to engage the clutch when it is closed and to disengage the clutch when it is opened, the finger 65 may be insulating whilst the ring 64 would be a conductor.

It will be understood that the invention is not to be limited to the forms of construction described and shown but includes all the alternative forms which embody its various members.

What we claim is:

1. A gear-changing lever of the kind having two main constituent members, and especially adapted for use on automobile vehicles, said lever being associated with a gear-box and an electrically-operated clutch and comprising an actuating-member intended to be operated by the user and a control-member coupled to said gear-box, means for mounting said actuating-member so as to be movable in every direction with respect to said control-member over a limited travel starting from a central position of rest, abutment means on each said member for ensuring that, beyond said limited travel, the two said members move as one, elastic means for restoring said actuating-member to a central position of rest, an electric switch associateed with said clutch, at least two contacts constituting said switch, said contacts being separate and distinct from said abutment means, a carrying-element for each said contact, and means for elastically coupling at least one of said contact carrying-elements to the member on which it is supported, whereby the relative latitude of movement in all directions of said contact-carrying elements is greater than the relative latitude of movement of said actuating-member and said control-member, and is limited only by the mechanical abutment of said members.

2. A lever as claimed in claim 1, in which the contact elements of said electric switch are adapted to be brought into contact by a relative travel of said contact elements less than the maximum travel permitted by said separate mechanical abutment means.

3. A lever as claimed in claim 2, in which the said contact-elements are adapted to be brought into contact by a relative travel of said actuating-member and said control-member amounting to between twenty percent and eighty percent, and preferably between forty percent and sixty percent of the maximum relative travel permitted by the said separate mechanical abutment means.

4. A lever as claimed in claim 1, in which the travel of the said actuating-member between the central position of rest and the position at which it abuts against said control-member is constant, irrespective of the direction of travel of said actuating-member with respect to said control-member.

5. A lever as claimed in claim 1, in which the travel of the said actuating-member between the central position of rest and the position of abutment with said control-member is variable with the direction of movement of said actuating-member with respect to said control-member.

6. A lever as claimed in claim 1, in which the said abutment means and said electric switch are comprised within the interior of said lever and are spaced apart longitudinally within said lever.

7. A gear-changing lever of the two-part type especially adapted for use in automobile vehicles, and associated with a gear-box and an electrically-operated clutch, said lever comprising a pivoted gear-selector member, a tubular sleeve member detachably fixed to the upper extremity of said gear-selector, an insulating cup-shaped member mounted in said sleeve adjacent said selector extremity, a conducting rod passed centrally through said cup member, a rounded nipple formed on the upper end of said conducting rod, an insulated electric wire connected to the lower end of said rod and associated with said clutch, a transverse shoulder formed internally of said sleeve, an actuating-rod engaged by its lower portion in the upper part of said sleeve, said upper part terminating in a bell-mouthed orifice, a collar fixed on said actuating-rod near its lower extremity, said collar being formed with spherical sides and being adapted to engage at its upper face with said transverse shoulder, and at its spherical sides with the internal wall of said sleeve, an extension of said rod below said collar, said extension being of smaller diameter than said rod, a threaded end-member formed on said extension and of smaller diameter than said extension, a close-coiled spiral spring screwed at its upper portion on said end-member, and a loaded spiral spring of diameter almost equal to that of said collar, said last-mentioned spring being engaged between the lower face of said collar and the upper peripheral edge of said insulating cup, the assembly being such that said close-coiled spring forming the lower extremity of said actuating rod surrounds and overlaps the upper portion of said insulated nipple, said spring and nipple constituting elastically-associated electric switch contacts.

8. A lever as claimed in claim 7, in which the association of the spherical sides of said collar with said sleeve and said loaded spring constitutes a universal coupling between said actuating-rod and said sleeve, said bell-mouthed upper portion of said sleeve constituting an abutment adapted to limit the travel of the relative movement of said actuating-rod and said sleeve, said limit of travel being constant irrespective of the direction of said relative movement.

9. A lever as claimed in claim 7, in which the said actuating-rod is intended for operation by the user, and comprises a knob at its upper extremity, and an elastic hood enclosing the junction between said rod and said sleeve.

10. A lever as claimed in claim 7, in which the said loaded-spring constitutes a means for restoring said actuating-rod to the central position of rest.

11. A gear-changing lever of the two-part type especially adapted for use in automobile vehicles and associated with a gear-box and an electrically-operated clutch, said lever comprising a pivoted gear-selector, a tubular sleeve detachably mounted on the upper extremity of said selector, a tubular insulating member disposed in said sleeve adjacent said selector extremity, a metallic sheath enclosing said insulating member, a conducting-rod mounted in said insulating member, an enlarged threaded head formed on said conducting rod above said insulating member, said head being adapted to engage the lower portion of a close-wound spiral spring member, an insulated electric wire connected to the lower end of said conducting rod and associated with said clutch, a transverse shoulder formed inside said sleeve, an actuating-rod engaged by its lower portion in the upper part of said sleeve, said upper part terminating in a bell-mouthed orifice of oval cross-section, a collar fixed on said actuating-rod near its lower extremity, said collar being adapted to engage at its upper face with said transverse shoulder and at its sides with the internal wall of said sleeve, an extension of said actuating-rod projecting below said collar, said extension being of smaller diameter than said rod, an elongated nipple with rounded end terminating said extension, and a loaded spiral spring of diameter almost equal to that of said collar, said loaded spring being engaged between the lower face of said collar and said metallic sheath, the assembly being such that said close-coiled spring forming the upper extremity of said insulated rod and threaded head surrounds and overlaps the lower portion of said rounded nipple, said spring and nipple constituting elastically-associated electric switch contacts.

12. A lever as claimed in claim 11, in which the association of said collar with the internal wall of said sleeve and said loaded spring constitutes a universal coupling between said actuating-rod and said sleeve, said bell-mouthed orifice of oval internal section constituting an abutment surface adapted to limit the travel of the relative movement of said actuating-rod and said sleeve, said limit of travel varying with the direction of said relative movement.

13. A lever as claimed in claim 11, in which said loaded spring constitutes a means for restoring said actuating-rod to the central position of rest.

14. A lever as claimed in claim 11, in which the said actuating-rod member and said sleeve-member are electric conductors and are connected to ground, the contact carried by said sleeve being insulated therefrom and connected to an insulated wire associated through said sleeve with said clutch, the other contact being electrically connected to ground through at least one of said members.

15. A lever as claimed in claim 14, in which the said actuating-rod is connected to ground through the intermediary of the said sleeve-member.

16. A lever as claimed is claim 11, in which the loading stress on said loaded spring has a value greater than that corresponding to the force required to prevent vibration of said actuating-rod, and to resist unintentional external action to which the said rod may be subjected, but has a value less than that corresponding to the effort required to operate the gear-box.

17. A gear-changing lever of the two-part type adapted for use with an automobile vehicle and associated with a gear-box and an electrically-operated clutch, said lever comprising a gear-selector member, a tubular sleeve detachably mounted on the upper horizontal extremity of said selector, a tubular insulating member disposed in said sleeve adjacent said selector extremity, a metallic tube enclosing said insulating member, a conducting rod mounted centrally within said insulating member and projecting outwards therefrom, an external thread formed on said projecting portion, a close-wound spiral spring engaged over part of its length on said threaded projection, an insulated wire connected to the inner end of said conducting rod and associated with said clutch, a transverse shoulder formed inside said sleeve, an actuating-rod engaged by its inner portion in the outer part of said sleeve, said outer part terminating in a bell-mouthed orifice, a collar fixed on said actuating-rod near its inner extremity, said collar being adapted to engage at its outer face with said transverse shoulder, and at its sides with the internal wall of said sleeve, an extension of said actuating-rod projecting inwards from said collar, said extension being of smaller diameter than said rod, an externally-threaded contact-carrier member formed on said extension, a second close-wound spiral spring engaged over part of its length on said contact carrier, said second close-wound spiral spring of substantially larger diameter than said first-mentioned close-wound spiral spring, and a loaded-spring of diameter almost equal to that of said collar, said loaded-spring being engaged between the said inner face of said collar and said metallic tube, the assembly being such that said last-mentioned close-wound spring surrounds and overlaps said first-mentioned close-wound spring, said two close-wound springs each constituting an elastic electric switch contact, a hollow operating member adapted to enclose the whole said assembly and means for elastically coupling said operating member transversely and longitudinally to said actuating-rod.

18. A lever as claimed in claim 17, in which the coils of said spiral springs constituting the said contacts are wound close together without touching, each said spiral spring being screwed over a length of its threaded supporting member which is less than the full threaded length of said member.

19. A lever as claimed in claim 17, in which at least two coils of each contact constituted by a spiral spring are left free between the last coil screwed on to the externally-threaded supporting member and the extremity of the other contact.

20. A lever as claimed in claim 19, in which the extremity of the contact which is mounted internally of the other contact is rounded.

21. A gear-changing lever of the two-part type adapted for use with an automobile vehicle and associated with a gear-box and an electrically-operated clutch, said lever comprising a gear-selector member, a metallic disc of rounded cross-section secured to the upper horizontal extremity of said selector, a circular passage formed centrally along the length of said horizontal portion including said disc, a flanged insulating sleeve disposed in the extremity of said selector, a metallic finger mounted in said insulating sleeve, a circular head formed on said finger in contact with said flanged sleeve, said head having a metallic ball inset in its outer face, an insulated wire housed in said passage and making said finger associated with said clutch, a hollow actuating member, a cylindrical bore in said member, a tubular piston slidably mounted in said bore, a loaded spiral spring within said piston and engaged between said piston and said actuating-member, an enlarged head formed on the side of said piston nearest said selector, a contact finger fixed centrally on said head and a concave bowl-shaped insulating member mounted on said contact finger, said concave surface co-operating with said inset ball, the whole said assembly being housed within the inner extremity of said actuating-member.

22. A lever as claimed in claim 21, in which the sliding contact between said concave surface and said ball provides a universal movement between said actuating-member and said selector, said ball and said central finger constituting the contacts of an electric switch associated with said clutch.

23. A lever as claimed in claim 21, in which the association of said disc with the internal wall of said hollow actuating member constitutes an abutment limiting the relative movement of said actuating member and said selector.

24. A lever as claimed in claim 21, in which said loaded spring serves at the same time as a means of restoring said actuating-member to the position of rest, as an elastic means of applying together said contacts and as a permanent electrical connection between said finger and said actuating-member, the latter being connected to ground at its base.

References Cited in the file of this patent

UNITED STATES PATENTS

| | | |
|---|---|---|
| 2,263,047 | Newton | Nov. 18, 1941 |
| 2,635,722 | Wemp | Apr. 21, 1953 |